United States Patent Office 2,962,529
Patented Nov. 29, 1960

2,962,529
PROCESS FOR PREPARING THIOCARBONYL FLUORIDE
David Maley Marquis, Wilmington, Del., assignor to E. I. du Pont de Nemours and Company, Wilmington, Del., a corporation of Delaware
No Drawing. Filed Aug. 26, 1958, Ser. No. 757,432
4 Claims. (Cl. 260—543)

This invention is directed to a novel process for the preparation of thiocarbonyl fluoride,

This process comprises the pyrolysis of a mixture of a halomethane with sulfur or hydrogen sulfide. The required halomethane is a compound of the formula $CF_2HX$ or $CF_2X_2$ where X is chlorine or bromine. The thiocarbonyl fluoride product, heretofore obtainable only in low yields, is a valuable monomer for polymerization and copolymerization reactions as hereinafter described.

Known processes fail to obtain thiocarbonyl fluoride in good yield and high quality; for example, Tyczkowski and Bigelow, J. Amer. Chem. Soc., 75, 3523 (1953), report a preparation of thiocarbonyl fluoride by direct fluorination of carbon disulfide. However, their yield was less than 1% of impure material, B.P. —40° C., F.P. —134° C., and mol. wt., 90 (actual mol. wt., 82.08); also, Ruff is reported to have isolated thiocarbonyl fluoride, B.P. —40° C., by fluorinating carbon disulfide with iodine pentafluoride (F.I.A.T. Final Report 1114, page 26; Ruff, B.I.O.S. Final Report 1595, item 22). Haszeldine and Kidd, J. Chem. Soc., 3219 (1953), suggest that the compound isolated by Ruff was actually $SOF_2$ and show that the reaction of $CS_2$ and $IF_5$ produces bis(trifluoromethyl)disulfide. These same workers in J. Chem. Soc., 3871 (1955), postulate that trifluoromethyl mercaptan reacts with sodium fluoride to give thiocarbonyl fluoride which is stated to be thermally unstable. However, U.S. Patent 2,820,807 shows that the products of reaction of sodium fluoride with the mercaptan are $CF_3SCSF$ and $(CF_3S)_2C=S$, and not thiocarbonyl fluoride. Thiocarbonyl fluoride has been shown to have a B.P. of —59° C.

It is an object of the present invention to prepare thiocarbonyl fluoride in high yield. It is a further object of the present invention to prepare thiocarbonyl fluoride by a process utilizing commercially readily available components and conventional production equipment.

These and other objects will become apparent in the following description and claims.

More specifically, the present invention is directed to a process for preparing thiocarbonyl fluoride which comprises contacting a mixture containing a halomethane compound of the formula $CF_2HX$ or $CF_2X_2$, where X is chlorine or bromine, and a sulfur compound chosen from the group consisting of sulfur and hydrogen sulfide, at temperatures of from about 500° C. to about 900° C. while maintaining molar ratios of said organic material to said inorganic within the range of 2:1 to 1:4, and isolating the resulting thiocarbonyl fluoride by distillation.

The organic starting materials for the process are halogen substituted methanes; specifically, four members of this group which are operable in the present process are monochlorodifluoromethane, monobromodifluoromethane, dichlorodifluoromethane, and dibromodifluoromethane. The inorganic starting materials for the process are sulfur and hydrogen sulfide. The ratio of the two components of the mixture to be pyrolyzed should be nearly equimolar, although the process can be operated where the molar ratio of halogen-substituted methane to sulfur compound is from 2:1 to 1:4.

According to the process of the present invention, the sulfur component being hydrogen sulfide, the two different components which make up the mixture, that is, halomethane and hydrogen sulfide, are continuously introduced in the vapor phase into a reactor which is inert to the starting materials. When the sulfur component is sulfur itself, the sulfur is heated up to its molten state and maintained at a temperature of about 400° C. The halomethane component in the vapor phase is then bubbled through the molten sulfur. The resulting mixture of halomethane and sulfur, whose composition is determined by the temperature of the sulfur, is then introduced as a gaseous or vapor-phase mixture into the same reactor as above. Alternatively, the sulfur and halomethane may be metered separately. The reactor is maintained at a temperature from about 500° C. to about 900° C. The preferred temperature range is from 700° C. to 800° C. A convenient form of a reactor is a metal tube; however, it must be inert to the reactants. A preferred material of construction which yields a convenient inert material is a platinum-lined reactor. A tube of high purity alumina may also be used. During the process the reactor tube may be heated by conventional methods. A preferred and convenient way is to place the tube in two electric furnaces, which supply the heat necessary to maintain the reaction temperature. Each furnace may be a different temperature providing though that each temperature is within the above specified range. A preferred manner of operation is to keep the furnace heating the first portion of the reactor tube in contact with the reactants approximately 50° C. below the temperature of the portion of the reactor contacted last. In the reactor tube the reactant vapors are converted to the desired thiocarbonyl fluoride by pyrolytic reaction, i.e., by the action of heat.

The product gases are then collected from the outlet of the reactor tube, cooled, and the acid product HCl is removed by chemical separation. This removal is effected by passage of the reactor effluent through a countercurrent, circulating alpha-pinene scrubber. The product gases are then condensed, for example, in a receiver cooled by solid $CO_2$. The desired thiocarbonyl fluoride may be separated from the reaction mixture by distillation to yield a product of 96% purity. Alternatively, the by-product HCl may be removed by a physical separation, i.e., by distillation at superatmospheric pressures. The operable temperature limits have been found to be from about 500° C. to about 900° C. Below 500° C. the low conversion of halomethane to thiocarbonyl fluoride makes the process impractical. Above 900° C. the yield of thiocarbonyl fluoride starts to decrease.

Representative examples illustrating the present invention are as follows:

*Example 1*

The reactor used consists of an alumina tube, 24 inches in length and 1.2 cm. inside diameter. The tube is vertically supported and heated by two electric furnaces so that the bottom and top can be maintained at two different temperatures. Using a feed rate of 1.95 g./min. chlorodifluoromethane is bubbled through sulfur which has been heated to and maintained at 360° C. in a reservoir. The resulting mixture consists of a ratio of one mole of chlorodifluoromethane to 2 moles of sulfur, calculated from the vapor pressure of sulfur at 360° C. This mixture is passed into the vertical reactor tube, the lower half of which is at 700° C. and the upper, at 750° C. The effluent gases from the reactor tube are passed through a countercurrent, circulating alpha-pinene scrubber to remove the HCl formed in the reaction. There is collected in a receiver cooled by Dry Ice 2170 g. of material. This product is then distilled at atmospheric pressure through a ½" I.D. x 36" vacuum-jacketed, silvered column packed with metal springs yielding the following fractions:

|            | b.p. (° C.)     | wt. (g.) |
|------------|-----------------|----------|
| Foreshot   |                 | 300      |
| I          | −60.8 to −59.5  | 990      |
| II         | −59.5 to −59.0  | 377      |
| III        | −59.0 to −58.0  | 111      |
| Residue    |                 | 390      |

Mass spectographic analysis of fraction II yields:

|         | Mole percent |
|---------|--------------|
| $CF_2S$ | 96.4         |
| COS     | 1.0          |
| Others  | 2.6          |
|         | 100.0        |

Example 2

Using a platinum-lined metal reactor in place of the alumina reactor of Example 1, 1.6 g./min. of chlorodifluoromethane is bubbled through sulfur maintained at 400° C. (i.e., molar ratio of $CHClF_2$:S is 1:4). The reactor temperatures are 750° C. in the lower half of 800° C. in the upper. After removing HCl as described in Example 1, the product composition is:

|           | Mole percent |
|-----------|--------------|
| $CF_2S$   | 89.4         |
| COS       | 1.4          |
| $CHClF_2$ | 3.5          |
| Others    | 5.7          |
|           | 100.0        |

Example 3

Following the method of Example 2, the following conditions are maintained: $CHClF_2$ feed rate 1.0 g./min.; sulfur at 325° C. (molar ratio of $CHClF_2$:S is 1.25:1); lower reactor temperature 420° C.; upper reactor temperature 535° C. Instead of removing HCl with alpha-pinene, it is removed by washing with water. The product has the following composition:

|           | Mole percent |
|-----------|--------------|
| COS       | 0.6          |
| $CHClF_2$ | 99.1         |
|           | 99.7         |

The washing of the product gas stream with water causes hydrolysis of thiocarbonyl fluoride to carbonyl sulfide (COS) and HF. Hence the amount of COS indicated is equivalent to the amount of $CF_2S$ formed in the reaction.

Example 4

Following the procedure of Example 2, dibromodifluoromethane at a rate of 2.2 g./min. is passed through sulfur held at 345° C. (molar ratio of $CBr_2F_2$:S is 1:1.4). The temperature of the lower portion of the reactor is 690° C. and that of the upper, 810° C. After removing HCl as described in Example 2, the composition of the product is:

|           | Mole percent |
|-----------|--------------|
| $CF_2S$   | 35.8         |
| $CF_2Br_2$| 17.4         |
| $CF_3Br$  | 17.0         |
| Others    | 29.8         |
|           | 100.0        |

Example 5

Following the procedure of Example 3, dichlorodifluoromethane at a rate of 1.7 g./min. is passed through sulful held at 370° C. (molar ratio of $CCl_2F_2$:S is 1:2). The temperature of the lower portion of the reactor is 690° C. and that of the upper, 805° C. After washing with water as described in Example 3, the composition of the product is:

|           | Mole percent |
|-----------|--------------|
| COS       | 7.2          |
| $CCl_2F_2$| 78.8         |
| $CF_3Cl$  | 8.2          |
| Others    | 5.8          |
|           | 100.0        |

The washing of the product gas stream with water causes hydrolysis of thiocarbonyl fluoride to carbonyl sulfide (COS) and HF. Hence the amount of COS indicated is equivalent to the amount of $CF_2S$ formed in the reaction.

Example 6

The reactor consists of a platinum-lined metal tube 0.40 cm. I.D. heated over an effective length of 10 inches. A mixture of chlorodifluoromethane at 125 cc./min. (25° C.) and $H_2S$ at 94 cc./min. (25° C.) are passed through the reactor held at 650° C. The effluent gases are washed with water and dried. The product then has the following composition:

|           | Mole percent |
|-----------|--------------|
| $CHClF_2$ | 59.2         |
| $H_2S$    | 33.9         |
| COS       | 5.2          |
| Others    | 1.7          |
|           | 100.0        |

The washing of the product gas stream with water causes hydrolysis of thiocarbonyl fluoride to carbonyl sulfide (COS) and HF. Hence the amount of COS indicated is equivalent to the amount of $CF_2S$ formed in the reaction.

The thiocarbonyl fluoride obtained by the process of this subject invention has not been heretofore available in high yields and high purity. The present novel process therefore yields a valuable and highly reactive monomer, which can be polymerized to polymers of high molecular weight and possessing outstanding chemical inertness. Thiocarbonyl fluoride is also used for fumigation.

Thiocarbonyl fluoride prepared as described in this process is a colorless gas with an odor resembling mercaptans and boiling at −59° C./760 mm. It undergoes spontaneous polymerization on storage at ordinary temperature for periods ranging from two days to several weeks with the formation of liquid and solid polymers. The solid polymers have recurring ($-SCF_2-$) units. The liquid polymers consist of a dimer, $CF_3SCSF$, a trimer, $(CF_3S)_2C=S$, and higher homologues. The usefulness of the dimer and trimer is illustrated by U.S. Patent 2,820,807.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for preparing thiocarbonyl fluoride which comprises contacting a mixture of (1) a halomethane compound taken from the group consisting of monochlorodifluoromethane, monobromodifluoromethane, dichlorodifluoromethane, dibromodifluoromethane and chlorobromodifluoromethane, and (2) a sulfur compound taken from the group consisting of sulfur and hydrogen sulfide in an inert reactor, at temperatures of from about 500° C. to about 900° C., the molar ratio of said halomethane compound to said sulfur compound being within the range of 2:1 to 1:4, followed by recovering the resulting thiocarbonyl fluoride.

2. The process of claim 1 wherein the halomethane compound is monochlorodifluoromethane.

3. The process of claim 1 wherein the halomethane compound is monochlorodifluoromethane and the sulfur compound is sulfur.

4. The process of claim 1 wherein said temperature is within the range of from about 700° C. to about 800° C.

References Cited in the file of this patent

Bennett et al.: Nature, vol. 166, page 225 (1950).